US012168537B2

(12) United States Patent
Lobisser et al.

(10) Patent No.: US 12,168,537 B2
(45) Date of Patent: *Dec. 17, 2024

(54) VACUUM STORAGE OF PERISHABLES AND CYCLINDRICAL STORAGE VESSEL METHOD, SYSTEM, AND APPARATUS

(71) Applicant: Ripelocker LLC, Bainbridge Island, WA (US)

(72) Inventors: George Frank Lobisser, Bainbridge Island, WA (US); G. Kyle Lobisser, Bainbridge Island, WA (US); Eric Levi, Bainbridge Island, WA (US); Todd Hansen, Bainbridge Island, WA (US); Justin Chase Bothell, Port Townsend, WA (US)

(73) Assignee: Ripelocker LLC

( * ) Notice: Subject to any disclaimer, the term of this patent is extended or adjusted under 35 U.S.C. 154(b) by 532 days.

This patent is subject to a terminal disclaimer.

(21) Appl. No.: 17/176,063

(22) Filed: Feb. 15, 2021

(65) Prior Publication Data

US 2021/0163165 A1 Jun. 3, 2021

Related U.S. Application Data

(63) Continuation of application No. 15/923,611, filed on Mar. 16, 2018, now Pat. No. 11,008,151, and a
(Continued)

(51) Int. Cl.
*B65B 31/02* (2006.01)
*B65B 25/00* (2006.01)
(Continued)

(52) U.S. Cl.
CPC .......... *B65B 31/025* (2013.01); *B65B 25/001* (2013.01); *B65D 81/2038* (2013.01); *B65D 85/34* (2013.01)

(58) Field of Classification Search
CPC ..... B65B 31/04; B65B 31/025; B65B 25/001; B65B 25/041; A23B 7/148;
(Continued)

(56) References Cited

U.S. PATENT DOCUMENTS 2,890,810 A * 6/1959 Rohling .................. B65B 31/00
206/508
3,085,913 A * 4/1963 Caswell ................. H10N 60/00
427/63
(Continued)

OTHER PUBLICATIONS

Stanley P. Burg, Postharvest Physiology Hypobaric Storage Fresh Produce, CABI Publishing, Oxfordshire, UK, ISBN 0851998011, copyright S.P. Burg 2004.
(Continued)

*Primary Examiner* — Eric S Stapleton
(74) *Attorney, Agent, or Firm* — AEON Law, PLLC; Adam L. K. Philipp; Ki Yong O

(57) ABSTRACT

Systems, methods, and apparatus for storing perishable items under reduced pressure conditions. Total atmospheric pressure within a vacuum chamber containing a perishable item is reduced below a total pressure limit. Oxygen partial pressure and total pressure within the vacuum chamber are monitored. When oxygen partial pressure falls below a lower oxygen partial pressure limit, an oxygen-containing gas is admitted to raise oxygen partial pressure above the lower oxygen partial pressure limit. When the total atmospheric pressure reaches or exceeds the total pressure limit, total pressure is once again reduced. The vacuum container or chamber comprises a section of cylindrical pipe open at both ends, a first end cap and a second end cap, and formed of a plastic material. Notwithstanding that the pipe and end caps are formed of plastic, they are formed with a structure capable of withstanding pressure created by a high vacuum in the vacuum container.

9 Claims, 8 Drawing Sheets

Related U.S. Application Data continuation of application No. 15/923,529, filed on Mar. 16, 2018, now Pat. No. 10,919,656.

(60) Provisional application No. 62/472,316, filed on Mar. 16, 2017, provisional application No. 62/472,284, filed on Mar. 16, 2017.

(51) Int. Cl.
*B65D 81/20* (2006.01)
*B65D 85/34* (2006.01)

(58) Field of Classification Search
CPC ............ B65D 81/2038; B65D 81/2076; B65D 81/2007; B65D 85/34
USPC .......................................................... 99/472
See application file for complete search history.

(56) References Cited

U.S. PATENT DOCUMENTS

| | | | |
|---|---|---|---|
| 3,418,783 A * | 12/1968 | Collons | B65D 43/0218 53/469 |
| 3,419,893 A * | 12/1968 | Vahlstrom | E05B 37/025 70/24 |
| 4,113,095 A | 9/1978 | Dietz et al. | |
| 4,591,055 A | 5/1986 | Corn | |
| 4,643,314 A | 2/1987 | Kidd | |
| 5,028,443 A | 7/1991 | Wade | |
| 5,111,938 A | 5/1992 | Soprano et al. | |
| 5,261,976 A * | 11/1993 | Schultz | C21D 1/773 148/628 |
| 5,450,998 A | 9/1995 | Esse et al. | |
| 5,487,471 A | 1/1996 | Marchek et al. | |
| 5,498,481 A | 1/1996 | Marchek et al. | |
| 5,983,830 A * | 11/1999 | Cox | A01K 45/007 119/6.8 |
| 6,536,192 B2 | 3/2003 | King et al. | |
| 6,962,654 B2 * | 11/2005 | Arnaud | B01D 21/2433 210/143 |
| 7,203,574 B2 | 4/2007 | Caci et al. | |
| 8,783,002 B2 | 7/2014 | Bowden et al. | |
| 10,759,588 B1 * | 9/2020 | Lobisser | B65D 19/02 |
| 2002/0085950 A1 * | 7/2002 | Robitaille | A61L 2/24 422/298 |
| 2003/0173276 A1 * | 9/2003 | Arnaud | B01D 21/245 210/150 |
| 2007/0258855 A1 * | 11/2007 | Turcot | A61L 2/202 422/243 |
| 2009/0230012 A1 * | 9/2009 | Choy | B65D 81/2015 220/592.2 |
| 2010/0200599 A1 * | 8/2010 | Molthen | B65D 19/06 220/592.27 |
| 2011/0132801 A1 * | 6/2011 | Elder | B65D 19/18 108/51.11 |
| 2011/0247622 A1 * | 10/2011 | Schneider | A61M 16/107 128/204.23 |
| 2013/0156912 A1 * | 6/2013 | Espinosa | A23L 3/0155 426/418 |
| 2015/0108037 A1 * | 4/2015 | Evans | B65D 19/18 108/50.11 |
| 2021/0163165 A1 * | 6/2021 | Lobisser | B65D 85/34 |
| 2023/0312151 A1 * | 10/2023 | Lobisser | B65B 25/001 |

OTHER PUBLICATIONS

Dickson et al., "Abatement of Ethylene by Ozone Treatment in Controlled Atmosphere Storage of Fruits and Vegetables", Paper No. 92-6571, presented at the 1992 International Winter Meeting sponsored by the American Society of Agricultural Engineers, 9 pages.

Karaca et al., "Effect of continuous 0.3 µL/L gaseous ozone exposure on fungicide residues on table grape berries", Postharvest Biology and Technology, vol. 64, 2012, pp. 154-159.

\* cited by examiner

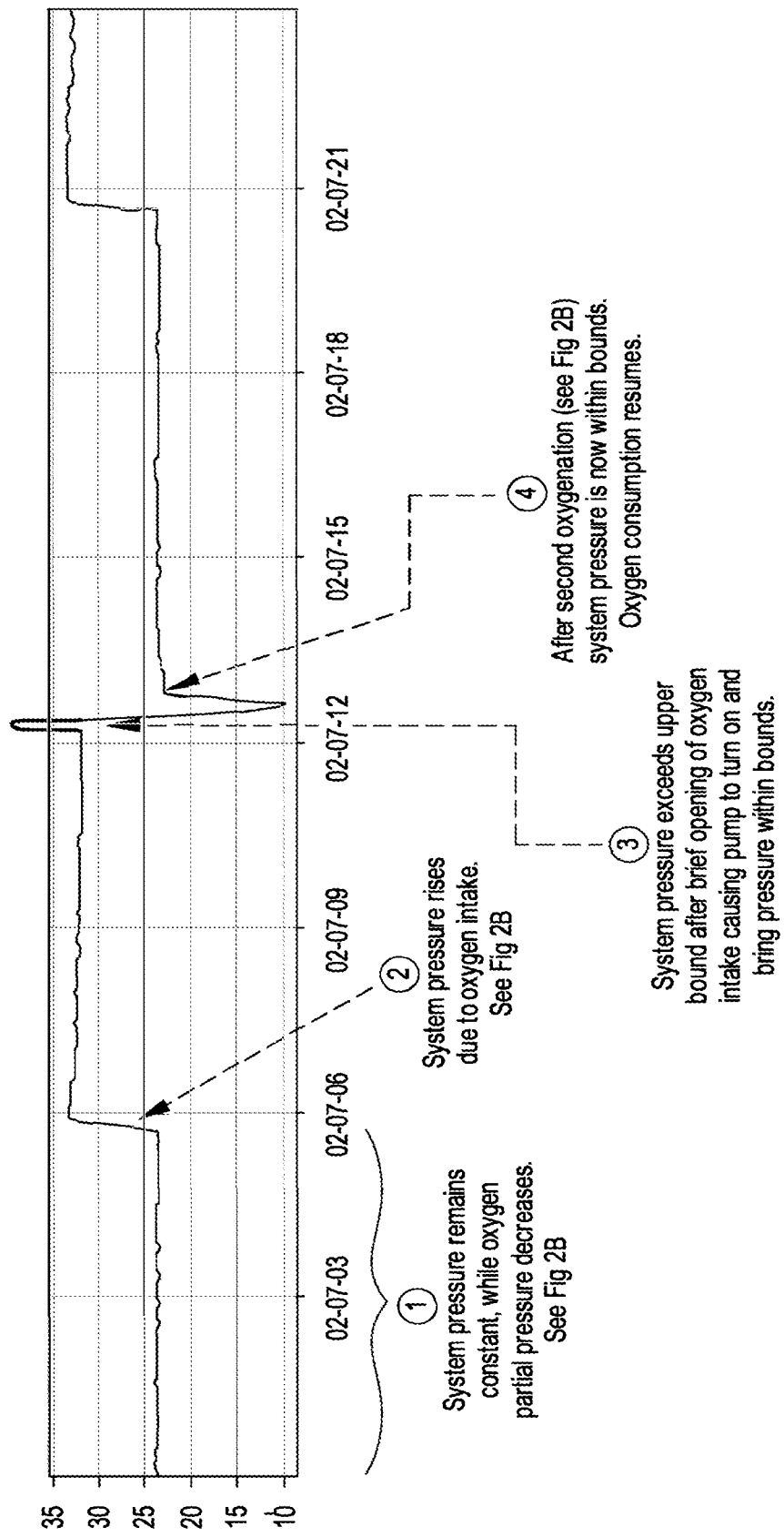

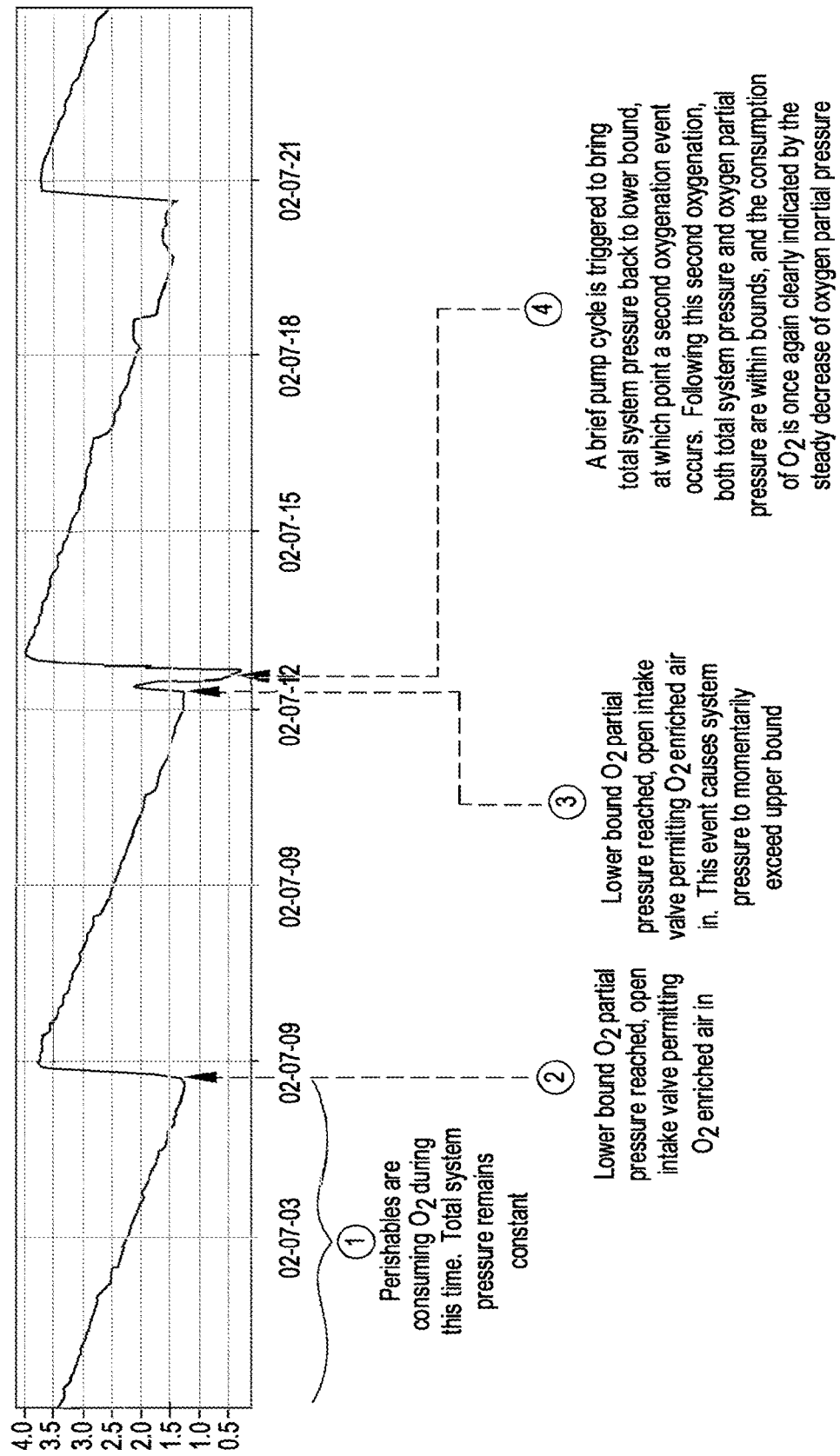

TOTAL SYSTEM PRESSURE

VACUUM STORAGE OF PERISHABLES AND CYCLINDRICAL STORAGE VESSEL METHOD, SYSTEM, AND APPARATUS

CROSS REFERENCE TO RELATED APPLICATIONS

This patent application is a continuation of U.S. patent application Ser. No. 15/923,529, filed Mar. 16, 2018; patent application Ser. No. 15/923,529 claims the benefit of and priority to U.S. provisional patent application Ser. No. 62/472,284 filed Mar. 16, 2017. This patent application is also a continuation of U.S. patent application Ser. No. 15/923,611, filed Mar. 16, 2019; patent application Ser. No. 15/923,611 claims the benefit of and priority to U.S. provisional patent application Ser. No. 62/472,316 filed Mar. 16, 2017. The disclosure of all of the foregoing applications are hereby incorporated by reference for all purposes and benefit of and priority to the filing dates of all of the foregoing applications are hereby claimed.

FIELD OF THE INVENTION

The invention relates to systems, methods, and apparatus for controlling environmental conditions within a sealed chamber for preserving perishable products.

BACKGROUND

It has been determined by Stanley P. Burg that by placing perishable items in vacuums under low pressure between approximately 10 to 150 Torr, in combination with refrigeration, the degradation or senescence of the perishable can be significantly slowed as compared to refrigeration alone.

However, to implement low pressure storage of perishable items on a commercially practical scale requires vacuum chambers that are not only able to withstand the forces caused by a high vacuum within the chamber but ones that can be easily and economically fabricated as well. The storage and shipment of perishable goods currently takes place primarily on rectangular pallets and within rectangular boxes or reusable plastic containers (RPC). The reasons for this are obvious; the buildings in which produce is packed and stored are rectangular, the trucks that transport the pallets use rectangular trailers, and for longer journeys, the boats and rail cars use rectangular containers. To maximize the packing efficiency along the entire distribution chain, rectangular pallets are used. While there are no universally accepted standards for the exact dimensions of pallets, they are most commonly rectangular or square in shape.

In addition, to date, no attempt has been made to alter environmental conditions under vacuum other than to hold constant pressure which results in a constant oxygen percentage.

SUMMARY OF INVENTION

An invention disclosed herein is directed to apparatus, systems, methods, and control techniques for placing and keeping harvested fruits, vegetables, and other perishable commodities in a vacuum environment from shortly after they are harvested until shortly before they are offered for retail sale. By setting and measuring pressure levels and oxygen levels independent of one another, oxygen can be controlled so as to avoid anaerobic respiration, yet pressure can be reduced to the lowest number possible so as to derive the benefits of increased respiratory gas and volatile diffusion. By setting pressure and oxygen floors and ceilings the pump and air intakes associated with the vacuum system are only required to operate when the interior parameters fall outside the set ranges. This results in a reduced pump run time, the opportunity to do away with supplemental humidification, and for the opportunity for one vacuum pump to control multiple vacuums.

In addition, an invention disclosed herein is directed to apparatus, systems, and methods for placing and keeping harvested fruits, vegetables and other perishable commodities in a vacuum environment from shortly after they are harvested until shortly before they are offered for retail sale.

In one aspect, the invention is directed to the construction, fabrication and implementation of transportable vacuum chambers that can be easily and economically fabricated. In particular, the invention is directed to transportable vacuum chambers for use in placing and keeping harvested fruits, vegetables and other perishable commodities in a vacuum environment following harvest and during transport, wherein the vacuum chambers are easily and economically fabricated largely from existing components and materials.

In another aspect, the invention relates to the design, manufacturing methods, and application of a cylindrical vacuum vessel used for the storage and transport of perishable goods under low pressure conditions.

These and other features and advantages will be apparent from a reading of the following detailed description and a review of the associated drawings. It is to be understood that both the foregoing general description and the following detailed description are explanatory only and are not restrictive. Among other things, the various embodiments described herein may be embodied as methods, devices, or a combination thereof. The disclosure herein is, therefore, not to be taken in a limiting sense.

BRIEF DESCRIPTION OF THE FIGURES

FIG. 2(a) is a graphical depiction of total pressure vs. time data showing pressure variations in a vacuum storage container operated in accordance with one aspect of the methods disclosed herein.

FIG. 2(b) is a graphical depiction of oxygen partial pressure vs. time data showing oxygen pressure variations in a vacuum storage container operated in accordance with another aspect of the methods disclosed herein.

DETAILED DESCRIPTION

Figure 1:
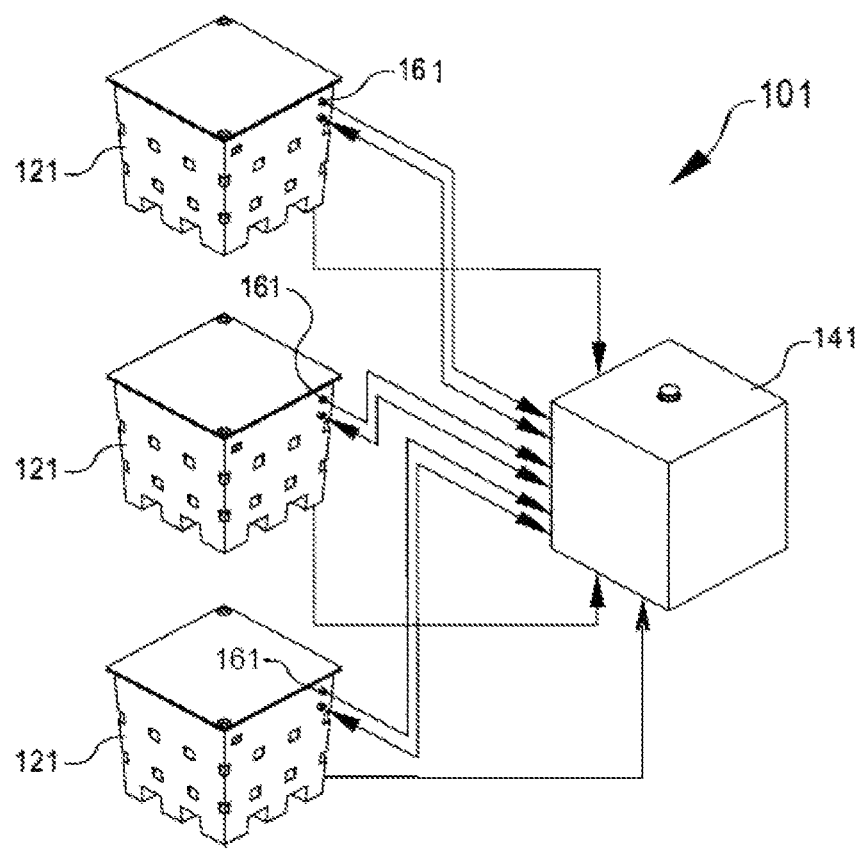
FIG. 1 is a schematic view of a system for storing and transporting perishable products under vacuum conditions using a plurality of vacuum containers under the control of a master control and pump unit.

Various embodiments will be described in detail with reference to the drawings, wherein like reference numerals represent like parts and assemblies throughout the several views. Many details of certain embodiments of the disclosure are set forth in the following description and accompanying figures so as to provide a thorough understanding of the embodiments. Reference to various embodiments does not limit the scope of the claims attached hereto. Additionally, any examples set forth in this specification are not intended to be limiting and merely set forth some of the many possible embodiments for the appended claims.

Control of Floor and Ceiling Conditions in Reduced Pressure Environment

FIG. 1 depicts in schematic form a system 101 for maintaining perishables in a reduced pressure, controlled atmosphere environment for purposes of maintaining freshness and avoiding spoilage. Such a system is described in application Ser. No. 15/294,554, entitled "SYSTEM AND METHOD FOR TRANSPORTING AND STORING POST-HARVEST FRUITS, VEGETABLES AND OTHER PERISHABLE COMMODITIES UNDER CONTROLLED ATMOSPHERIC CONDITIONS," filed Oct. 14, 2016, the specification of which is incorporated by reference herein.

As shown in FIG. 1, the system 101 includes one or more chambers 121 capable of withstanding a high vacuum within and arranged to contain the perishable item(s). Each of the containers is coupled to a control unit 141 that includes a number of devices, such as vacuum pumps, temperature sensors, pressure sensors, oxygen sensors and humidity sensors, for monitoring such parameters within the containers as pressure, humidity, gas concentrations, etc. These devices communicate with the chambers via one or more apertures 16 in the containers.

In accordance with one aspect of the invention, a control system is included in the control unit 141 for controlling atmospheric parameters according to protocols that, in accordance with another aspect of the invention, optimize energy efficiency, reduced senescence, and allocation of available resources.

The control system disclosed herein manages environmental conditions inside the vacuum storage chambers to maintain optimal conditions for preserving perishable products. The control system comprises one or a plurality of programmable logic controllers, vacuum pumps and intake valves with and without air enrichment membranes connected to the chambers either independently, or as a multi-chamber control system network to facilitate management of the environmental conditions inside the storage chambers. The control system includes the following:

1. Programmable logic controller (may include multiple processors for additional independent process control needs)—Programmable logic controller can control one or a plurality of chambers.

2. Vacuum pump—can control one or a plurality of chambers.

3. Sensors consisting of a) oxygen; b) temperature; c) pressure, all for use with one or a plurality of chambers.

4. Valves—can control one or a plurality of chambers.

5. Oxygen enrichment technology consisting of a membrane at the air inlet which raises oxygen levels above relative atmospheric concentration levels, or the system can be connected to oxygen storage containers. A separate embodiment of the control system facilitates a more cost-effective approach leveraging a manifold in which a set of common valves may communicate with the pump, oxygen membrane, vent, and sensors. These, via logic in the control system would be opened along with a specific chamber valve when a specific event is required e.g. pumping or oxygenation on that specific chamber.

6. Control system which can be controlled via a connected network (Wi-Fi, cellular, Nodal etc.) or a programmable logic controller supported by an algorithm which does away with the requirement to be networked. During normal operation, as events transpire, the control system will need to service multiple chambers. Chambers will be prioritized with their respective needs and serviced accordingly in order of priority, and separately from each other.

7. Manifold of solenoids communicating with each other, including three common—oxygenation, vacuum pump, and vent along with a solenoid for each vacuum controlled by a common control system.

8. Accumulator tank and valve—A separate embodiment could include the use of an accumulator tank to facilitate "rapid" pump-down of the system or otherwise as a vacuum storage vessel to assist in servicing chambers as they need to be pumped down while improving use-efficiency of the pump in a multi chamber or even single chamber system. Vacuum would be "stored" in the accumulator to be used to help pump down chambers at a future point in time.

| Parameters monitored | Parameters that are controlled |
|---|---|
| Oxygen partial pressure | Pressure |
| Humidity | Oxygen |
| Total system pressure | |
| Chamber outside temperature | |
| Chamber commodity temperature | |

The programmable logic controller connects to the sensors, valves, and pump(s) to complete a control network to manage the independent vacuums. System pressure and, oxygen levels are maintained within a floor and ceiling independent of each other. Temperature, and humidity are monitored. To this end, the pump and/or intake only operate when the pressure and/or oxygen levels fall outside the floor and/or ceiling. Under certain conditions, if the management system does not account for temperature, normal reduction in pressure during a pump-down cycle in the system may be sluggish or not proceed at all do to water vapor-pressure constraints which would allow any liquid water to enter a gas phase-change drastically reducing pumping efficiency. Under these conditions the system will compensate and adjust the floor of the operational range of the chamber pressure control parameters to prevent continuous pump operation. Capturing historical operating data for specific perishables allows for the opportunity to build predictive algorithms as to how the vacuums should operate, potentially doing away with the networked system and/or sensor feedback system.

The vacuum pump facilitates the pump down of the vacuum system to maintain the pressure of the chamber(s) within their floor and ceiling pressure set points. With the management system monitoring and maintaining oxygen in the chambers within their own floor and ceiling set points, the vacuum pump does not need to run continuously for a particular chamber(s).

The sensors utilized provide feedback directly to the programmable logic controller indicating operational conditions inside the chamber(s). Separate valves in the system allow for the in-flow of normal air or oxygen enriched air via the membrane, allowing air to be pumped out of the vacuum, and finally for the system to re-pressurize to atmospheric levels for loading/unloading etc. of the vacuum chamber(s).

An alternative embodiment utilizes the independent control of pressure and oxygen combined with pumping the hypobaric vessel to a low-pressure floor and slowly leaking normal air or oxygen enriched air into the vessel at a very low rate allowing the perishable to consume oxygen. The rate at which the oxygen is added to the system controls the respiration rate of the commodity stored within and is limited to an amount, just enough to keep the commodity from suffering anaerobic damage. At a given pressure ceiling the chamber is pumped back to its lower pressure threshold and the controlled oxygen leak-up cycle is repeated. This limits pumping time while sustaining a low pressure that assists in the diffusion of respiratory gasses and volatiles. This process also limits commodity water loss by retaining the water vapor within the chamber.

In accordance with another aspect of the invention, a process for "flushing" the vacuums is provided. As the perishable items undergo senescence they produce gases and volatiles. These gases and volatiles build up inside the chamber and may cause harm to the perishables. The vacuum pump can be set to operate at a certain interval regardless of whether or not pressure is within the set floor and ceiling, so as to evacuate the chamber of these harmful gases and volatiles.

In accordance with still another aspect of the invention, the pressure is allowed to rise above what is historically considered low pressure for example up to 300 Torr. The purpose for this is to relieve the chamber of material "creep" to the structure which can result in catastrophic failure of the vacuum container. Even though the pressure is allowed to rise oxygen can be controlled independently so as to keep between the targeted floor and ceiling.

In accordance with still another aspect of the invention, a manifold with multiple solenoids is provided which includes three common solenoids (pump, 02 membrane, vent), along with a solenoid for each individual chamber in a system of multiple chambers to be communicating with a common control system.

Temperature is monitored outside the chamber as well as inside the chamber. Temperature measurements are utilized for alert-based indications.

Operating Protocols:

1. System Pressure—The pump will activate to bring down the pressure to its lower bound of the two pressure-control set-points. Any other operations for maintaining oxygen level are bypassed if pressure reaches the upper bound trigger point. This means, that the oxygen membrane will not be allowed to flow oxygen-enriched air into the chamber if the pump is running (or, if in a multi-chamber, single pump system, a pump down valve may be opened or closed to control pump down) for any reason. Once the low threshold is met of the total system pressure, oxygen membrane control resumes. In addition, the pump could be set to run at certain intervals so as to evacuate gaseous mixtures from the chamber regardless of whether or not system pressure is within the set floor and ceiling.

2. Oxygen control—The air intake valve allowing the in-flow of normal air or oxygen enriched air via the membrane is triggered on/off by upper and lower bound limits of oxygen partial pressure. The oxygen concentration is measured continuously and if oxygen levels are low enough to allow the oxygen membrane to remain triggered all the way through the upper limit of total system pressure, the vacuum pump will be turned back on to bring total system pressure to its lower limit. Oxygen membrane will be closed during the pump-down process.

3. Sensor reduction for multi-chamber control—Rather than measuring oxygen at each chamber with a separate sensor, the system may incorporate one oxygen sensor at the manifold block and periodically pump a designated chamber down for several seconds allowing accurate oxygen readings for each chamber while still using a single oxygen sensor.

4. Chamber re-pressurization valve—manually controlled to repressurize vacuums.

Figure 3:
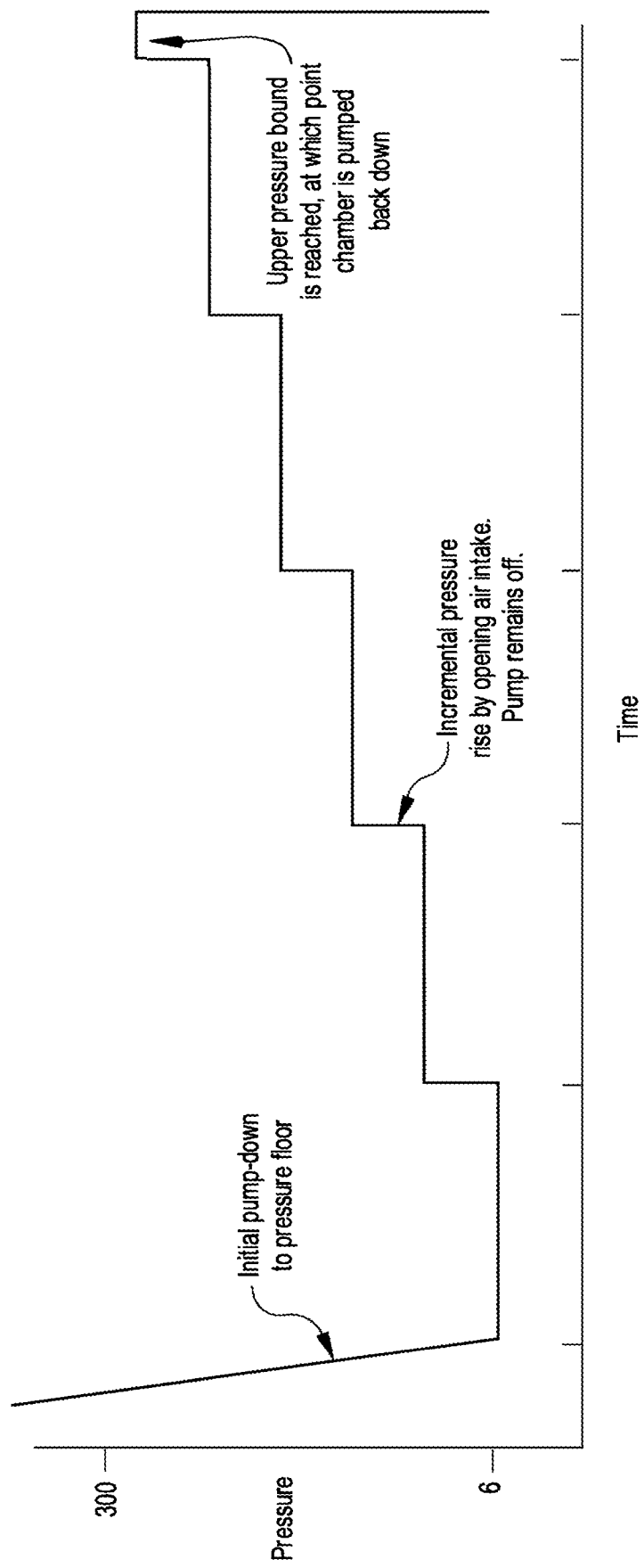
FIG. 3 is a graphical depiction of total system pressure vs. time data showing pressure variations in a vacuum storage container operated in accordance with another aspect of the methods disclosed herein.

The above-described operating protocols can be understood with reference to FIGS. 2-3.

As illustrated in FIG. 2A, the total pressure within the chamber has initially been reduced to approximately 24 Torr. As illustrated in FIG. 2B, the initial oxygen partial pressure is approximately 3.5 Torr. No further action is taken, and the perishable item contained within the chamber respires at these atmospheric conditions. As respiration continues, the oxygen partial pressure drops as the perishable item consumes oxygen.

When the oxygen partial pressure drops to a predetermined limit, such as approximately 1.25 Torr as illustrated in FIG. 2B, the intake valve to the chamber is opened, thereby permitting oxygen enriched air into the chamber. This has the effect of causing the total pressure within the chamber to rise to a predetermined upper limit, such as approximately 32.5 Torr, at which point the intake valve to the chamber is closed. As illustrated in FIG. 2B, this has the effect of increasing the oxygen partial pressure to approximately 3.75 Torr. Again, no further action is taken, and the perishable item contained within the chamber respires at these atmospheric conditions. Again, as respiration continues, the oxygen partial pressure drops as the perishable item consumes oxygen. This cycle repeats as the perishable item is stored, as further illustrated in FIGS. 2A and 2B.

As further illustrated in FIG. 2A, when the intake valve to the chamber is opened to admit oxygen enriched air, the total pressure in the chamber can, and likely will, momentarily exceed the upper pressure limit or bound set for storage of the perishable item. A brief pump cycle is then triggered to bring the total system pressure back to the lower bound, at which point a second oxygenation event occurs. Following this second event, both total system pressure and oxygen partial pressure are within the predetermined bounds, and the consumption of oxygen is again indicated by the steady decrease of oxygen partial pressure.

Another method of regulating oxygen partial pressure within the chamber is shown in FIG. 3. As illustrated, after the initial evacuation of the vacuum chamber, wherein the oxygen partial pressure is reduced to approximately 3.5 Torr, the intake valve to the chamber is opened at predetermined intervals, that may or may not be of equal length, to admit either atmospheric or oxygen enriched air into the chamber. The total system pressure thus increases in regular steps until it rises to a predetermined upper pressure bound, at which time the vacuum pump is operated to reduce pressure within the chamber to the desired atmospheric conditions.

Although particular pressures, times, etc., have been disclosed for illustrative purposes, it will be appreciated that these specific parameters do not limit the invention in its broader aspects.

Vacuum Storage Structures

Figure 5:
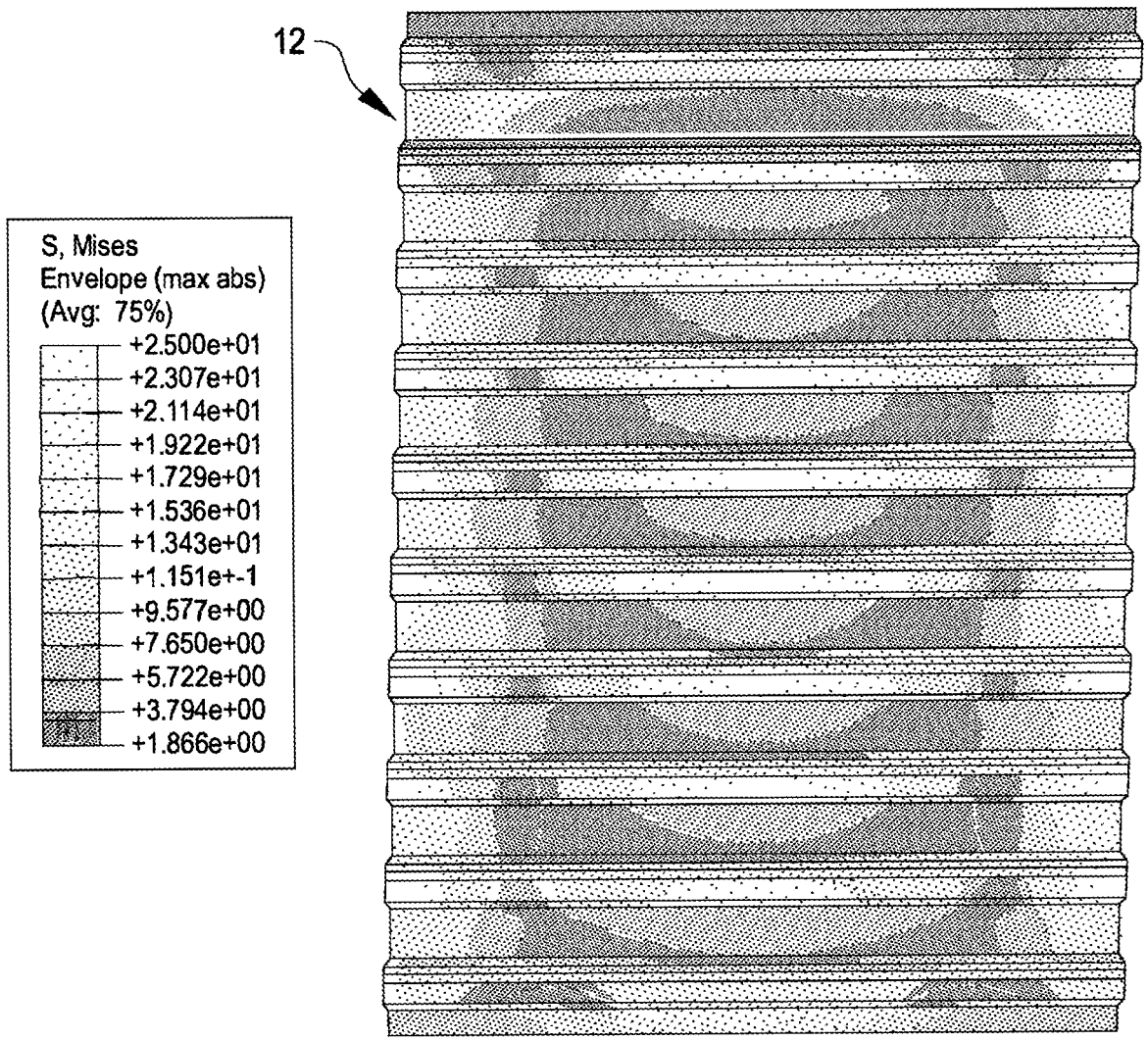
FIG. 5 is a contour plot, similar to FIG. 4, showing stress distribution in the rectangular wall of a cubic container subject to the same pressure loads as in FIG. 4.

Cubic shaped pallets and containers are most efficient for transporting goods when accounting for packing efficiency and logistics standards. However, cubic shaped structures are significantly less efficient reacting loads due to the application of high or low pressure. Pressurized gas cylinders are an example of a high pressure vessel, where walls are loaded primarily in tension due to outward pressure of the contained gas. A submarine under water is an example of a low pressure vessel, where the walls are loaded in compression due to the hydrostatic forces acting on all surfaces. Structural efficiency can be quantified by the amount of material used in the structure, the weight of the resulting structure, complexity of the design, and the sub sequent cost. Cubic shaped pressure vessels are very rare and are used only when packaging requirements necessitate a specific shape, or loads (pressures) are low, or the size is small. FIG. 5 shows examples of a cylindrical and square-shaped pressure vessel subject to a 1 atmosphere pressure load.

FIG. 5 is a contour plot showing stress distribution in a cylindrical structure 10 from equivalent pressure loading analyzed using Finite Element Analysis (FEA). As shown, stress levels throughout the structure range consistently and evenly between 5-9 MPa.

Figure 4:
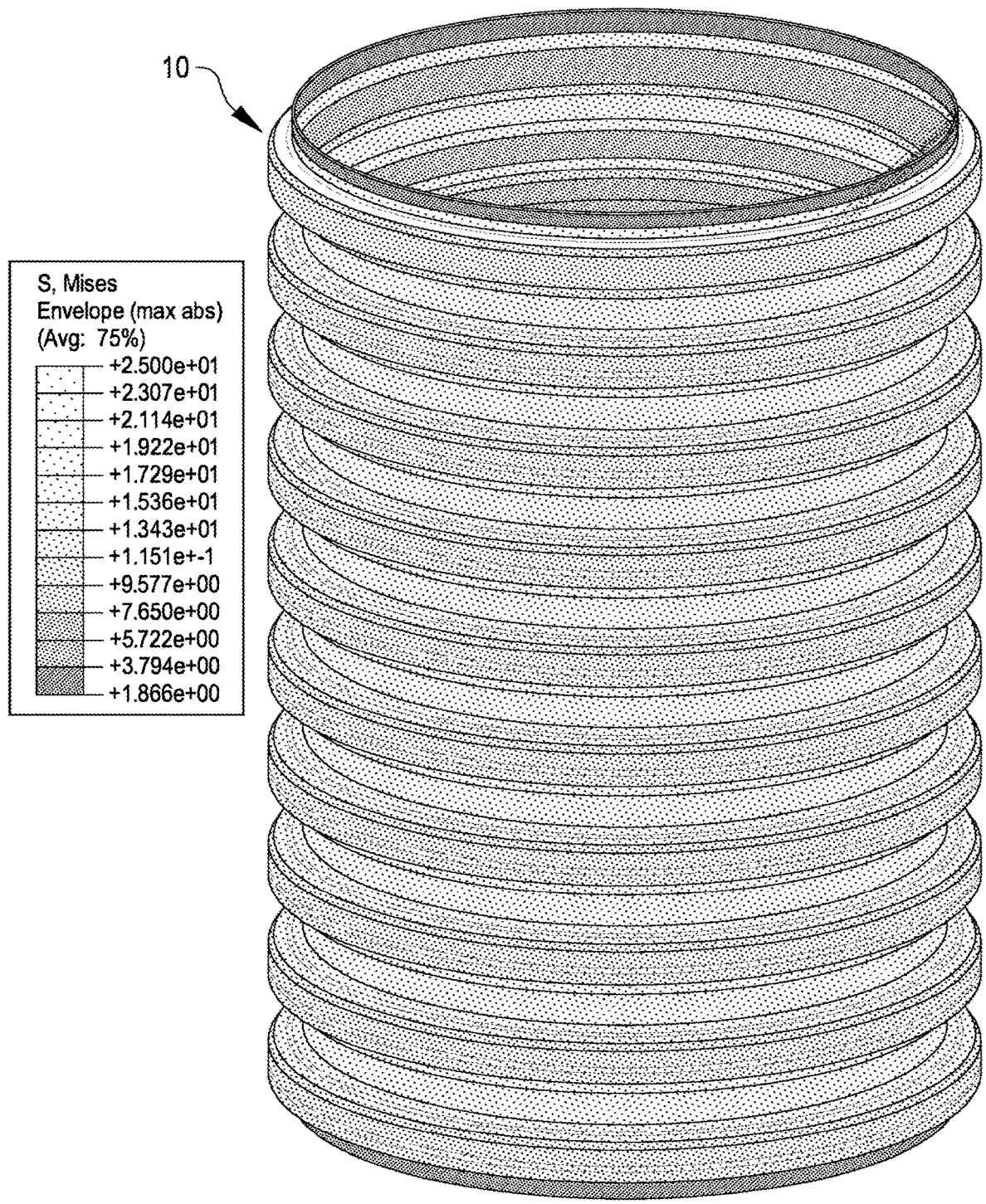
FIG. 4 is a contour plot showing stress distribution in a cylindrical structure from equivalent pressure loading analyzed using Finite Element Analysis (FEA).

FIG. 5 is also a contour plot, similar to FIG. 4, this time showing stress distribution in the rectangular wall of a cubic container 12 subject to the same pressure load of 1 atmosphere. As illustrated, the stresses vary dramatically throughout the structure due in large part to the resultant bending stresses. At the corners and at mid span, stress levels exceed the yield strength of the material, which in this case is ~25 MPa. In other areas, stresses are negligible. This is an example of an inefficient structure, and significant internal reinforcement is necessary to make the box capable of withstanding the loads resulting in increased weight and cost.

Materials

Atmospheric pressure is ~14 psi at sea level, multiple orders of magnitude lower than the typical operating pressure of a high pressure tank (3,000 psi). While most high pressure tanks are manufactured from exotic composites or high strength metallic materials, the relatively low pressures of a vacuum chamber allow for cheaper materials to be employed including commodity grade thermoplastics. Candidate polymers include PP, HDPE, and PVC. While thermoplastic polymers like PP, HDPE, and PVC provide exceptional manufacturing rates, toughness, and low cost, they have low strength and are prone to suffer from creep during extended periods of applied force, even if this force results in stress well below the typical yield point. The reduced modulus and strength due to creep can lead to permanent deformation of the chamber, which can lead to loss of seal or structural stability. To further enhance the strength and stiffness of these materials, and to reduce the effects of creep, fillers including discontinuous glass or carbon fibers can be added to the polymers during the compounding process yielding a cheap composite material capable of high rate manufacturing.

Metallic materials such as aluminum and steel do not suffer from creep, and can be valid candidate materials for vacuum vessels as well. However, other issues including weight, difficulty maintaining seal following the manufacturing process, and cost do make them less attractive candidates.

Thermosetting polymers including, but limited to, epoxy, vinyl ester, and polyester are also immune to the effects of creep. When reinforced with high strength, continuous fibers such as glass or carbon, these composite materials are extremely strong and stiff, and can result in reduced wall thickness and weight of the structure. However, thermosetting polymers inherently take more time to cure, which reduces the manufacturing rate of the vessels while increasing cost. They also have lower toughness than thermoplastic polymers, which can be a problem when considering the abuse due to common shipping conditions.

Architecture

Low pressure (vacuum) vessel architecture differs dramatically from high pressure vessel design. Due to primarily compressive stress, the chamber architecture must provide adequate stiffness to prevent buckling of the walls or collapsing due to a geometric instability. In a single wall chamber, the wall thickness must be adequate to provide necessary stiffness and strength. For unreinforced thermoplastic materials, a single wall vessel of 36" diameter would need 0.4-0.5" wall thickness, although wall thickness can, depending upon application pressure, range between 0.10 and 1.00 inches.

To further enhance stiffness and increase buckling loads, additional layers of material can be added to the vessel. These additional walls can be shaped or corrugated to intermittently contact the inner liner and reduce the lengths of unsupported material span. The chamber can be extruded in a method similar to the now common large diameter plastic drainage pipes, and have 1-3 thinner layers of walls. When multiple plies, or layers of material are used, the total wall thickness can be thinner than a single ply architecture. This results in reduced cost, weight, and improved damage tolerance over single wall chamber designs. These benefits are again realized because of the additional stiffening characteristics of a shaped wall, which increases resistance of the structure to buckling.

Stronger and stiffer metallic and higher performance composite materials may be capable of withstanding the loads using much thinner walls. However, a single wall provides little resistance to abuse loads and can be more prone to leaking. In general, metallic and thermosetting composite materials take more time to fabricate than commodity grade thermoplastics.

The diameter of the chamber can be 30 to 48 inches, designed to fit on most common pallets. Heights of the chamber can range from 12 to 80 inches, common to most pallet shipments or perishables storage. It will be appreciated, however, that depending upon the application and goals, the chambers can be of other sizes as well.

Internal & External Support Structure

To manage large axial loads induced from the lid and base of the pipe or chamber, a central column may be placed along the central axis of the chamber spanning the two end structures. This support column will reduce axial loading in the walls of the chamber, which can lead to buckling and damage of the chamber. A small diameter but thick-walled internal structure such as an aluminum column can manage the applied axial loads more efficiently than the thin walls of the chamber. Depending on the strength and stiffness of the chamber and end structures, a plurality of internal support columns can be used. The distribution of these columns can be optimized depending on the design of the end structures and chambers If necessary, up to 5 columns may be used to manage the axial loads and reduce stress in the chamber walls.

In addition, longitudinal stringers of a higher strength and stiffness can be integrally molded into the walls of the plastic chamber. Conversely, so as not to affect useful storage area of the chamber, the support structure can be placed outside the vessel but near the vessel walls to improve load-bearing performance.

Pallet Base and Lid

The pallet base may look similar to existing pallets on the market today, with 4-way forklift entrance and sturdy legs. However, the loads to the vacuum far exceed the weight of any amount of supported fruit, so the pallet must be extremely strong and stiff. For example, the forces acting on the pallet base and lid exceed 14,000 pounds under full vacuum. The pallet architecture is based around known twin-sheet thermoforming technology, using integrally formed steel or aluminum stringers to react the out-of-plane vacuum forces.

HDPE is an attractive material for these vacuum pallet bases for a number of reasons. First, HDPE is exceptionally tough and resistant to damage. It also has extremely low permeability, meaning lower vacuum leak rates of the chamber. It is also very cheap, and easily formed using a number of processes.

To improve the performance of HDPE, fillers such as glass or carbon fibers can be added to the base resin. The resultant structure will be stronger and stiffer when compared to the same manufactured from unreinforced HDPE.

Other candidate materials include PP, PVC, and thermosetting polymers with various levels from reinforcement from 5%-60% by weight.

A separate lid may be conic or convex in shape to maintain stability and strength, without the need for metallic stringers. Or, the base pallet can be used as a lid, to minimize necessary part numbers and/or tooling costs.

Example Assemblies

Figure 6:
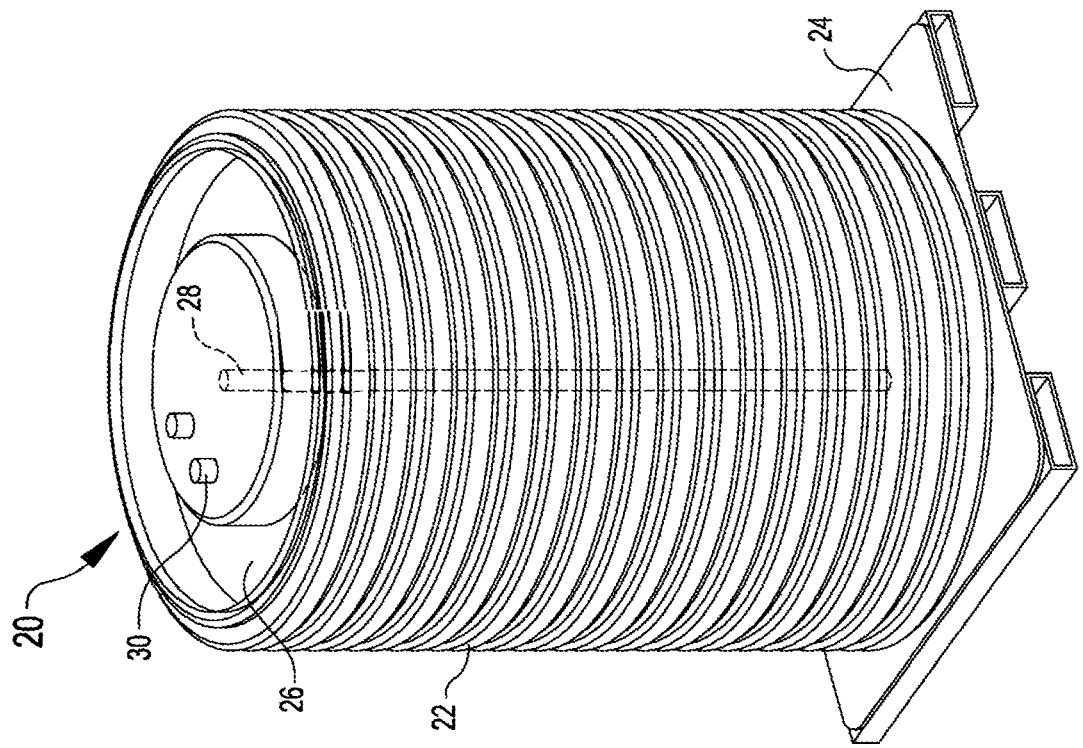
FIG. 6 is a perspective view of one embodiment of a cylindrical vessel for low pressure storage of perishable goods constructed in accordance with one aspect of the invention.

FIG. 6 depicts one embodiment of a cylindrical vessel 20 for low pressure storage of perishable goods constructed in accordance with one aspect of the invention.

As shown in FIG. 6, the cylindrical vessel includes a section of cylindrical large diameter corrugated plastic drainage pipe 22 having 1, 2 or 3 thinner layers of walls. The pipe is formed of a polymer, such as PP, HDPE, or PVC. Each layer of material ranges from 0.05" to 0.25". Where the material joint together, the total wall thickness may exceed ¼." The diameter of the pipe is preferably between 30 and 48 inches so as to fit on most common pallets. Preferably, the height of the chamber ranges from 12 to 80 inches, common to most pallet shipments or perishables storage.

As further illustrated in FIG. 6, the pipe rests on a generally square or rectangular pallet 24 that is preferably formed of Carbon reinforced HDPE. In the illustrated embodiment, the pallet is generally square and configured to be transported by standard fork trucks. The upper end of the pipe is fitted with a generally circular flat top or lid 26 that, after placement over the top end of the pipe 22, is sealed so as to permit the formation of a vacuum within the vessel. A seal is also provided between the lower end of the pipe and the upper surface of the pallet to help maintain the vacuum.

As further illustrated in FIG. 6, the vessel includes an interior support 28 that, in the illustrated embodiment, consists of a rigid cylindrical rod extending upwardly along the central axis of the pipe from the top of the pallet to the underside of the top or lid. The support can be formed of other suitable, rigid materials such as metal or higher performance composites. Various ports 30 are preferably provided in the top or lid to permit the attachment of such apparatus as vacuum pumps, sensors, gas inlets and other devices for monitoring and controlling the atmosphere within the vessel.

Figure 7:
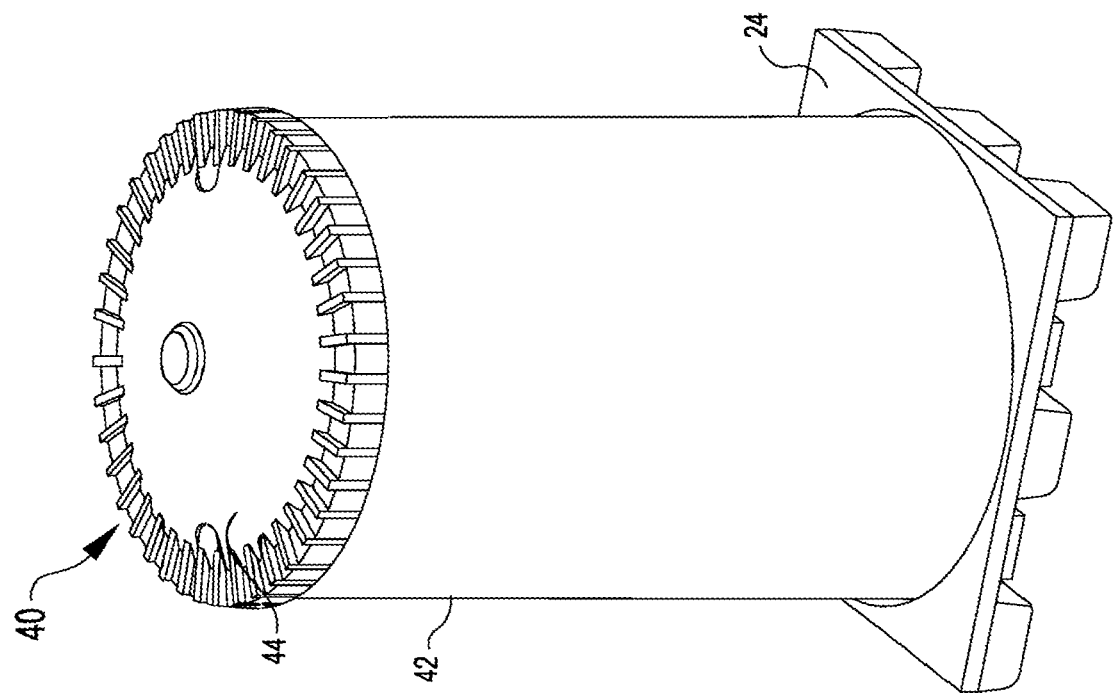
FIG. 7 is a perspective view of one embodiment of a cylindrical vessel for low pressure storage of perishable goods constructed in accordance with another aspect of the invention.

FIG. 7 depicts another embodiment of a cylindrical vessel 40 wherein the pipe section 42 is of a single layer configuration and wherein the top or lid 44 is of a convex shape. Again, the top or lid and the upper section of the pipe are detachably sealed to each other to maintain a vacuum within the vessel, as are the lower portion of the pipe and the pallet on which the pipe rests. The convex shape of the top or lid helps withstand the external pressures resulting from the formation of a vacuum within the vessel that allows the central support to be dispensed with. Alternatively, the central support can be included to further withstand the pressures that result. Furthermore, the lid can be concave in shape resulting in a state of tensile stress as opposed to compressive.

Figure 8:
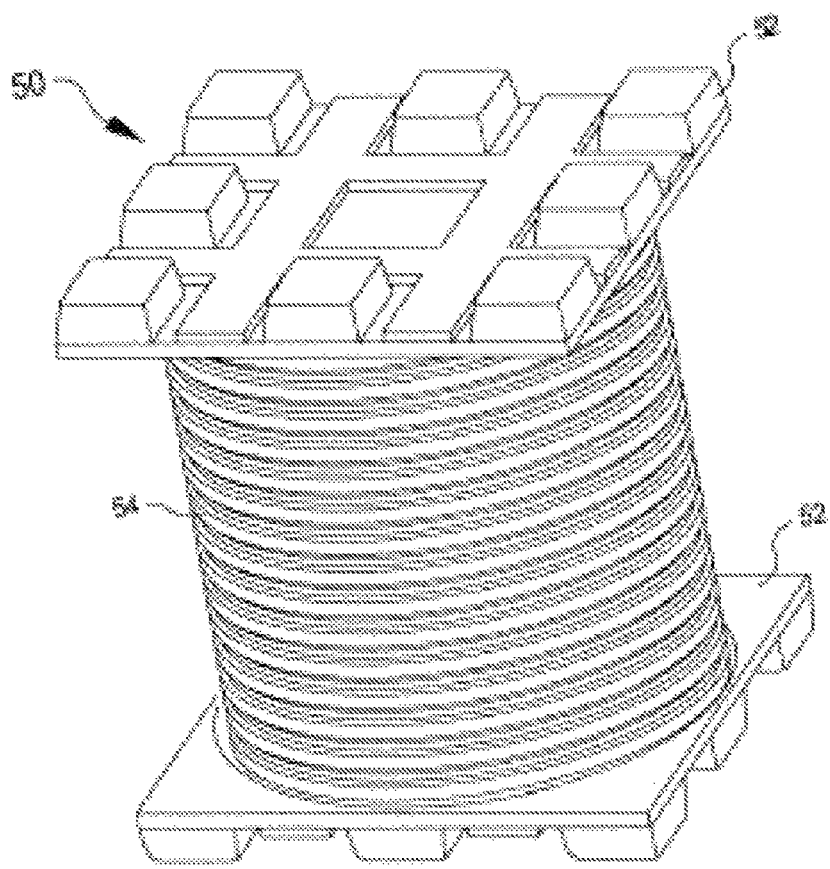
FIG. 8 is a perspective view of one embodiment of a cylindrical vessel for low pressure storage of perishable goods constructed in accordance with another aspect of the invention.

FIG. 8 depicts another embodiment of a cylindrical vessel 50 wherein a single pallet design 52 is used to seal both the upper and lower ends of the pipe 54. In this embodiment, the pipe is of a double or triple layer plastic design, and each of the upper and lower pallets are substantially the same. This has the advantage that sealing of the pipe can be accomplished with a single pallet design, resulting in reduced manufacturing costs and ease of use, in that a single inventory of pallets can be provided for sealing both ends of the pipe. Again, the top or lid and the upper section of the pipe are detachably sealed to each other to maintain a vacuum within the vessel, as are the lower portion of the pipe and the pallet on which the pipe rests. These thermoformed plastic pallets may include metallic stringers for additional strength.

Figure 9:
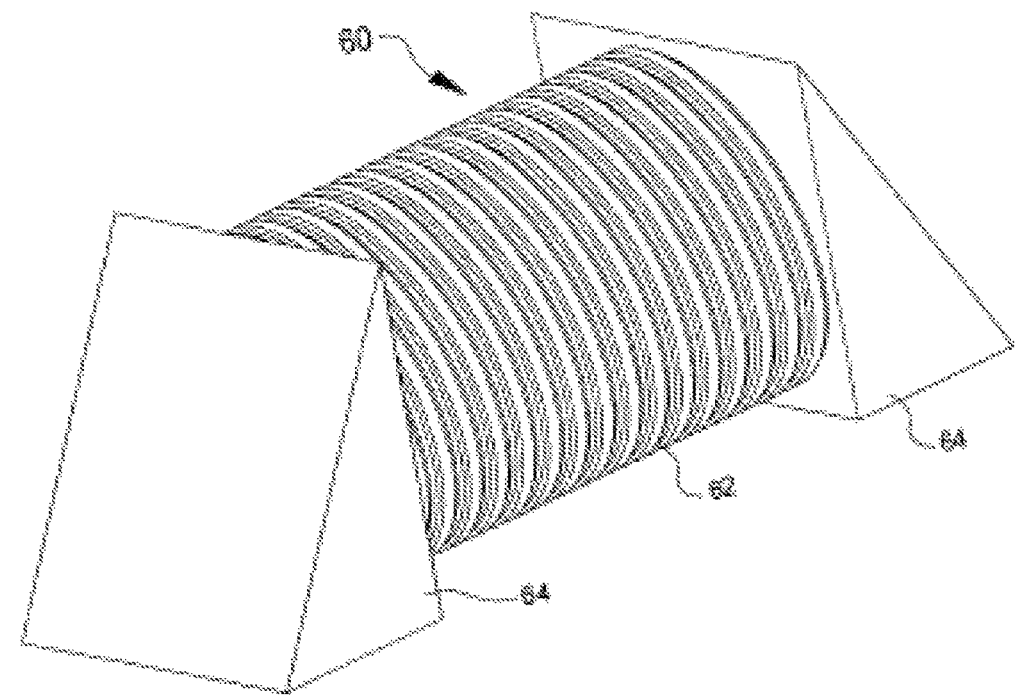
FIG. 9 is a perspective view of one embodiment of a cylindrical vessel for low pressure storage of perishable goods constructed in accordance with another aspect of the invention.

FIG. 9 depicts another embodiment of a cylindrical vessel 60 constructed in accordance with one aspect of the invention. In this embodiment, the chamber axis defined by the pipe 62 is aligned horizontally with the ground, with the end caps 64 supported using external framing. This allows for a longer vessel, statically affixed to the floor. Critical axial loads are managed by the framing supporting the end caps, as opposed to the walls of the vessel. The design and architecture of the end supports are not covered in detail at this time but eliminate the need for central support columns within the chamber.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A system to manage environmental conditions within a vacuum chamber to preserve perishable products within the vacuum chamber, the system comprising:
   a vacuum chamber, wherein the vacuum chamber is to contain a perishable item in low gas pressure conditions;
   a vacuum pump, wherein the vacuum pump is to reduce total gas pressure in the vacuum chamber to below an upper total gas pressure limit;
   an inlet valve, wherein the inlet valve is to admit an oxygen-containing gas into the vacuum chamber;
   a pressure sensor, wherein the pressure sensor is to monitor a total gas pressure in the vacuum chamber;

an oxygen sensor, wherein the oxygen sensor is to monitor an oxygen partial pressure in the vacuum chamber;
a control system, wherein the control system is to be coupled to the vacuum pump, the inlet valve, the pressure sensor and the oxygen sensor;
wherein the control system is to activate the vacuum pump to reduce the total gas pressure in the vacuum chamber below the upper total gas pressure limit, is to determine according to the oxygen sensor that the oxygen partial pressure in the vacuum chamber is below a lower oxygen partial pressure limit, is to open the inlet valve to admit the oxygen-containing gas into the vacuum chamber, and is to obtain the total gas pressure in the vacuum chamber from the pressure sensor, and
wherein the vacuum chamber comprises a section of stiff cylindrical pipe open at both ends and formed of a plastic material; a first end cap detachably secured to a first end of the section of stiff cylindrical pipe in sealing engagement therewith to form a vacuum resistant seal between the first end cap and the first end of the section of stiff cylindrical pipe; and a second end cap secured to a second end of the section of stiff cylindrical pipe in sealing engagement therewith to form a vacuum resistant seal between the second end cap and the second end of the section of stiff cylindrical pipe; wherein the section of stiff cylindrical pipe comprises at least two layers formed of a plastic material, wherein a first layer of the at least two layers formed of the plastic material is straight-walled and a second layer of the at least two layers formed of the plastic material comprises corrugations.

2. The system according to claim 1, wherein the low gas pressure conditions comprise the total gas pressure in the vacuum chamber ranging between 1.25 Torr and 300 Torr.

3. The system according to claim 1, wherein the control system is to operate the vacuum pump at intervals to at least partially flush the vacuum chamber of gases and volatiles in the vacuum chamber.

4. The system according to claim 1, wherein the control system is to monitor at least one of oxygen partial pressure, humidity, total system pressure, a temperature outside the vacuum chamber, or a temperature inside the vacuum chamber.

5. The system of claim 1, wherein the oxygen-containing gas is air.

6. The system of claim 1, wherein the oxygen-containing gas is enriched with oxygen such that the oxygen-containing gas contains more oxygen than air.

7. The system of claim 1, wherein the control system is to operate the vacuum pump when total atmospheric pressure in the chamber rises above the upper total pressure limit to once again reduce total atmospheric pressure in the vacuum chamber to below the upper total pressure limit.

8. The system of claim 1, wherein the corrugations are parallel to the first end cap and the second end cap.

9. A system to manage environmental conditions within a vacuum chamber to preserve perishable products within the vacuum chamber, the system comprising:
a vacuum chamber, wherein the vacuum chamber is to contain a perishable item in low gas pressure conditions;
a vacuum pump, wherein the vacuum pump is to reduce total gas pressure in the vacuum chamber to below an upper total gas pressure limit;
an inlet valve, wherein the inlet valve is to admit an oxygen-containing gas into the vacuum chamber;
a pressure sensor, wherein the pressure sensor is to monitor a total gas pressure in the vacuum chamber;
an oxygen sensor, wherein the oxygen sensor is to monitor an oxygen partial pressure in the vacuum chamber;
a control system, wherein the control system is to be coupled to the vacuum pump, the inlet valve, the pressure sensor and the oxygen sensor; wherein the control system is to activate the vacuum pump to reduce the total gas pressure in the vacuum chamber below the upper total gas pressure limit, is to determine according to the oxygen sensor that the oxygen partial pressure in the vacuum chamber is below a lower oxygen partial pressure limit, is to open the inlet valve to admit the oxygen-containing gas into the vacuum chamber, and is to obtain the total gas pressure in the vacuum chamber from the pressure sensor, wherein the vacuum chamber is a first vacuum chamber and further comprising a second vacuum chamber, wherein the system is to manage environmental conditions with the first vacuum chamber and the second vacuum chamber, further comprising a manifold, wherein the first vacuum chamber is to connect to the manifold via a first vacuum chamber valve, the second vacuum chamber is to connect to the manifold via a second vacuum chamber valve, the manifold is to connect to the vacuum pump, and wherein to reduce total gas pressure in the first vacuum chamber to below the upper total gas pressure limit, the vacuum pump is to reduce total gas pressure in the manifold and the first vacuum chamber valve is to be opened.

* * * * *